United States Patent
Fazzalari et al.

(10) Patent No.: US 8,892,307 B2
(45) Date of Patent: Nov. 18, 2014

(54) VEHICLE AXLE CONTROL METHOD, DEVICE AND SYSTEM

(75) Inventors: Francesco Fazzalari, Oxford, MI (US); Udo Ronnenberg, Wedemark (DE); Ulrich Weihe, Garbsen (DE); Jonathan LaFalce, Holly, MI (US)

(73) Assignees: WABCO GmbH, Hannover (DE); Meritor WABCO Vehicle Control Systems, Troy, MI (US)

( * ) Notice: Subject to any disclaimer, the term of this patent is extended or adjusted under 35 U.S.C. 154(b) by 692 days.

(21) Appl. No.: 13/040,967

(22) Filed: Mar. 4, 2011

(65) Prior Publication Data
US 2012/0226415 A1    Sep. 6, 2012

(51) Int. Cl.
*B62D 6/00*    (2006.01)
*B62D 61/12*   (2006.01)
*B60G 9/00*    (2006.01)
*B60G 17/015*  (2006.01)
*B62D 13/06*   (2006.01)

(52) U.S. Cl.
CPC *B62D 61/12* (2013.01); *B60G 9/00* (2013.01); *B60G 17/0152* (2013.01); *B62D 13/06* (2013.01); *B60G 2200/44* (2013.01); *B60G 2200/445* (2013.01); *B60G 2204/47* (2013.01)
USPC ........... 701/41; 701/50; 701/37; 180/209

(58) Field of Classification Search
CPC ........ B62D 13/06; B62D 13/00; B62D 61/12; B62D 61/125; B60D 1/42; B60D 1/44; B60D 1/46; B60D 1/465; B60D 1/24; B60D 1/246; B60D 1/30; B60G 17/016; B60G 17/005; B60G 9/00; B60G 5/00
USPC ......... 280/86.5, 444, 103, 446.1, 837, 405.1, 280/427, 430, 431, 789; 701/37, 41, 50; 180/14.1, 14.4, 14.6, 24.01, 209
See application file for complete search history.

(56) References Cited

U.S. PATENT DOCUMENTS

| | | | | |
|---|---|---|---|---|
| 4,212,483 A * | 7/1980 | Howard | ......................... | 280/444 |
| 4,792,148 A * | 12/1988 | Hintz | ......................... | 280/149.1 |
| 4,854,409 A * | 8/1989 | Hillebrand et al. | ........ | 180/24.02 |
| 5,364,113 A * | 11/1994 | Goertzen | ..................... | 280/81.6 |
| 5,390,945 A * | 2/1995 | Orr | ............... | 280/81.5 |
| 6,073,946 A * | 6/2000 | Richardson | .................. | 280/86.5 |
| 6,830,250 B2 * | 12/2004 | Cervantez et al. | ......... | 280/5.501 |
| 7,225,891 B2 * | 6/2007 | Gehring et al. | .............. | 180/14.2 |
| 2012/0123646 A1 * | 5/2012 | Mantini et al. | .................. | 701/48 |

* cited by examiner

*Primary Examiner* — Richard Camby
(74) *Attorney, Agent, or Firm* — Kramer Levin Naftalis & Frankel LLP

(57) ABSTRACT

A control method is provided for a vehicle, especially a utility vehicle trailer, that has at least one lifting axle that can be lowered and raised in a controllable manner and/or at least one steered axle that can be locked and unlocked in a controllable manner, and that also has a control device operable to control the lifting axle and/or the steered axle. When the vehicle is traveling in reverse, the control device automatically generates a control signal that lowers the lifting axle, and/or automatically generates a control signal that unlocks the steered axle. The control device can be embodied as an electronic control unit having a processor suitably programmed to carry out the foregoing process steps. The control device can be incorporated into a vehicle control system for a vehicle having an anti-lock braking system or an electronically controlled braking system.

37 Claims, 5 Drawing Sheets

VEHICLE AXLE CONTROL METHOD, DEVICE AND SYSTEM

FIELD OF THE INVENTION

The present invention generally relates to embodiments of a method for controlling the lifting axle and/or steered axle of a vehicle, especially a utility vehicle trailer. The present invention generally also relates to a programmable control device and a vehicle control system employing such a control device all adapted to effect lifting axle and/or steered axle control according to the embodiments of the inventive method.

BACKGROUND OF THE INVENTION

The inventive embodiments have application, in particular, to vehicles that have at least one lifting axle that can be lowered and raised in a controllable fashion, at least one steered axle that can be locked and unlocked in a controllable fashion, or both types of such vehicle axles. As used herein, an axle is understood to be a single vehicle axle or a multi-axle unit that is customary, in particular, in utility vehicles and that can have, for example, two or three axles arranged in the immediate vicinity of one another. The term lifting axle is used herein to refer to a vehicle axle that can be raised from the road surface by means of, for example, a rubber bellows that can be filled with compressed air, or lowered onto the road surface. A steered axle is understood to be, for example, a freely running, self-steering or steered axle that is positively steered by an external mechanism. In particular, in the case of utility vehicles, for example utility vehicle trailers, such steered axles are provided with a locking mechanism, with the result that, when necessary, the steered axle is locked in a straight-ahead travel position and can therefore be secured in position. DE 10 2008 031 089 A1 proposes, for example, locking such a steered axle of a trailer during reversing and also maintaining the lock during slow forward travel. DE 10 2008 054 328 A1 proposes automatically raising or lowering a lifting axle as a function of the axle load of another vehicle axle that is not embodied as a lifting axle. In addition, in the case of reversing, the lifting axle can automatically be raised in order to make the vehicle more maneuverable.

The foregoing proposals relate, in particular, to requirements and regulations in Europe. However, other countries, for example Canada, have regulations aimed at protecting roads and bridges against excessive and unnecessary wear caused by vehicles, particularly heavy lorries. In Canada, what are referred to as SPIF (Safe, Productive and Infrastructure Friendly) regulations require that multi-axle utility vehicles be equipped as far as possible with lifting axles and steered axles; in particular, combined axles, i.e., lifting steered axles, are to be provided.

SUMMARY OF THE INVENTION

Generally speaking, it is an object of the present invention to provide a control method for a vehicle that enables the vehicle to comply with SPIF regulations and the like. In addition, it is also an object of the present invention to provide a suitable control unit and a control system that can effect such a salutary control method.

According to a preferred embodiment of the present invention, a control device provided in the vehicle checks whether the vehicle is traveling in reverse. When reversing is detected, the control device controls lowering of the lifting axle and unlocking of the steered axle or both. For this purpose, the control device generates a control signal that automatically lowers the lifting axle, and/or generates a control signal that unlocks the steered axle.

By lowering the lifting axle during reversing, the other axles of the vehicle are relieved of loading and the overall load is therefore distributed among a plurality of axles. In this way, the loading on roads and bridges can be reduced. In addition, during reversing, a steered axle is unlocked, which provides the advantage of improved maneuverability of the vehicle during reversing, as well as further relieving loading on roads and bridges.

Furthermore, such automatic control of the lifting axle and/or of the steered axle by a control device has the advantage that incorrect control can be avoided. In addition, the operating comfort of the vehicle can be increased since an operator, for example the driver, is relieved of the burden of such control tasks.

According to another embodiment of the present invention, the control device checks whether the vehicle is traveling forwards. When forward travel is detected, the control device generates a control signal by which the lifting axle is raised, and/or generates a control signal that locks the steered axle.

According to another embodiment, the control signal by which the lifting axle is lowered is not generated by the control device in the case of reversing until a predefined vehicle weight and/or a predefined axle load is/are exceeded by one or more of the non-liftable axles of the vehicle.

According to a further embodiment, the control signal by which the steered axle is unlocked is not generated by the control device in the case of reversing until a predefined vehicle speed is exceeded.

According to yet another embodiment of the present invention, the control signal by which the steered axle is unlocked is generated by the control device in the case of reversing only if the lifting axle is lowered.

According to a still further embodiment, the control device is adapted to control at least one lifting axle and one steered axle configured as a combined liftable steered axle.

According to another embodiment of the present invention, the control device receives and preferentially processes operator control signals input by an operator via an operator control element.

According to a further embodiment of the present invention, the control device checks whether the vehicle is reversing based on a reversing signal received from a sensor.

According to a still further embodiment of the present invention, in the case of reversing, the control device automatically switches on at least one reversing light of the vehicle.

In accordance with another aspect of the present invention, a control device is provided that is embodied as a conventional electronic control unit including a programmable processor suitably programmed to carry out a control method according to embodiments of the present invention.

In addition, in accordance with another aspect of the present invention, a vehicle control system is provided that incorporates a control device according to embodiments of the invention in an anti-lock braking system (ABS) or an electronically controlled braking system (EBS).

It should be appreciated that the inventive embodiments are suitable, in particular, for SPIF vehicles, but can also advantageously be applied with respect to other vehicles that have at least one lifting axle and/or at least one steered axle and are expected to meet specific external requirements.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts, which are adapted to effect such steps, all as exemplified in the following detailed disclosure, and the scope of the invention will be indicated in the claims.

BRIEF DESCRIPTION OF THE DRAWINGS

For a fuller understanding of the inventive embodiments, reference is had to the following description taken in connection with the accompanying drawings in which.

DETAILED DESCRIPTION OF THE PREFERRED EMBODIMENTS

Figure 1:
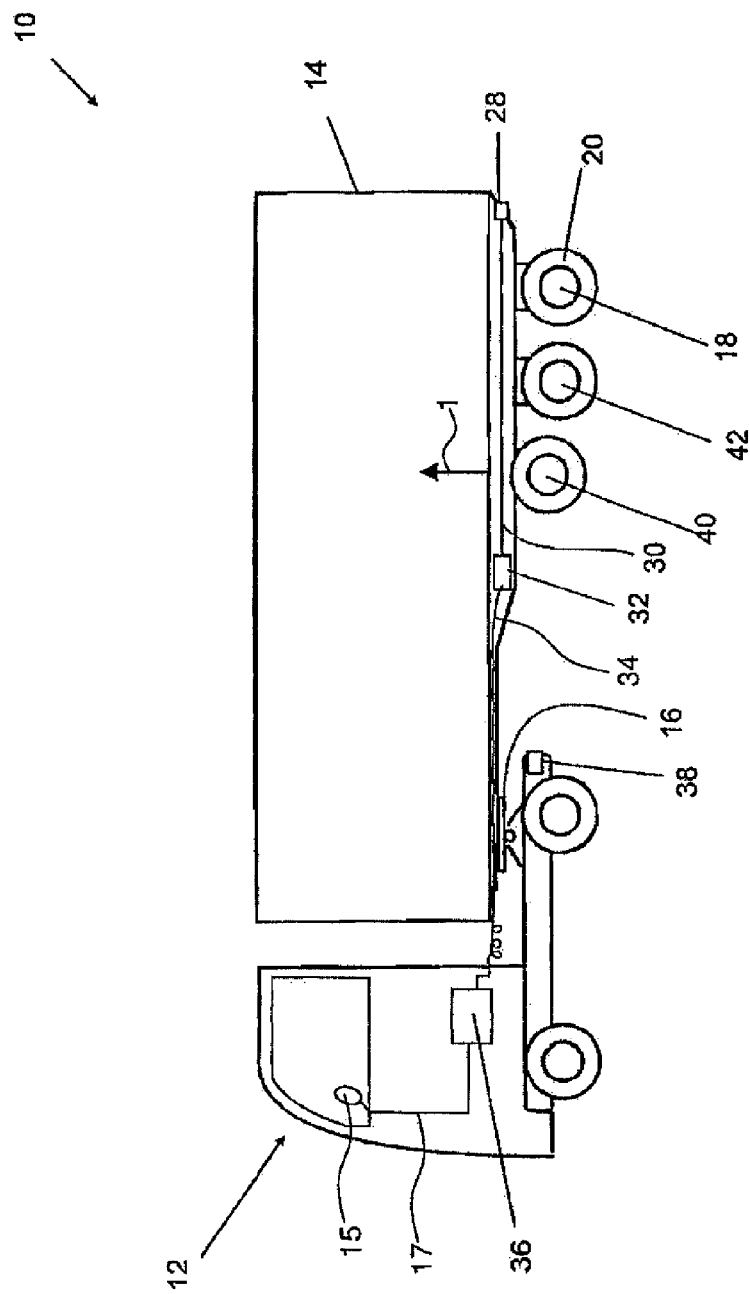
FIG. 1 is a side view of a tractor-trailer combination with a semitrailer.

Referring now to the drawing figures, where like reference symbols refer to like elements, FIG. 1 shows as an exemplary vehicle, a utility vehicle trailer 14, that is coupled to a tractor vehicle 12 via a coupling 16, and forms, with the tractor vehicle 12, a tractor-trailer combination 10. The utility vehicle trailer 14 is shown embodied as a semitrailer.

The utility vehicle trailer 14 has a self-steering steered axle 18 to which wheels 20 are attached. The trailer 14 has, apart from the steered axle 18, two further axles arranged relatively close to one another in the rear region of the trailer 14 in the manner of an axle unit. In the forward direction of travel, a second axle 42 and a third axle 40 are located in front of the steered axle 18. The third axle 40 is embodied as a lifting axle. Lifting axles are generally known, for example from DE 44 07 398 A1. In order to lift a lifting axle, an air bellows that can be filled with compressed air and that serves as a lifting bellows is provided. When the lifting bellows is filled with compressed air, the lifting axle 40 is raised and, in the process, lifted off from the underlying surface, i.e., the road. The lifting direction is illustrated in FIG. 1 by the arrow 1. Venting of the lifting bellows lowers the lifting axle 40. In addition, an air spring bellows of a pneumatic suspension system is filled with corresponding pressure so that the lifting axle is pressed against the road and bears a desired axle load of the trailer 14. In order to fill the lifting bellows and the air spring bellows with compressed air and empty them of compressed air, actuators are respectively provided, for example in the form of solenoid valves.

The trailer 14 comprises two trailer reversing lights 28 connected to an electronic control unit 32 via an electrical line 30. The electronic control unit 32 can be positioned in or on the trailer 14. The electronic control unit 32 can be connected to a central controller 36 in the tractor vehicle via a further electrical line 34, for example via a serial data bus. The electronic control unit 32 is configured, by means of appropriate programming using known programming techniques, to carry out the control processes according to embodiments of the present invention described herein.

The tractor vehicle 12 has, in addition to the central controller 36, a manually actuable operator control element 15 arranged in the driver's cab of the tractor vehicle 12—ideally, within the driver's reach. The operator control element 15 is connected to the central controller 36 via an electrical line 17.

As a result of actuation of the operator control element 15, the central controller 36 receives operator control signals, for example switch actuations or pushbutton key actuations. The operator control signals are processed internally by the central controller 36 and/or transferred to the electronic control unit 32 via the electrical line 34. As a result of actuation of the operator control element 15, the driver can manually trigger raising and lowering of the lifting axle 40 and locking and unlocking of the steered axle 18. Desirably, the manual control by the driver has priority over control carried out automatically by the electronic control unit 32 in accordance with the embodiments of the present invention described herein.

In addition, the tractor vehicle 12 can also have reversing lights 38.

Figure 2:
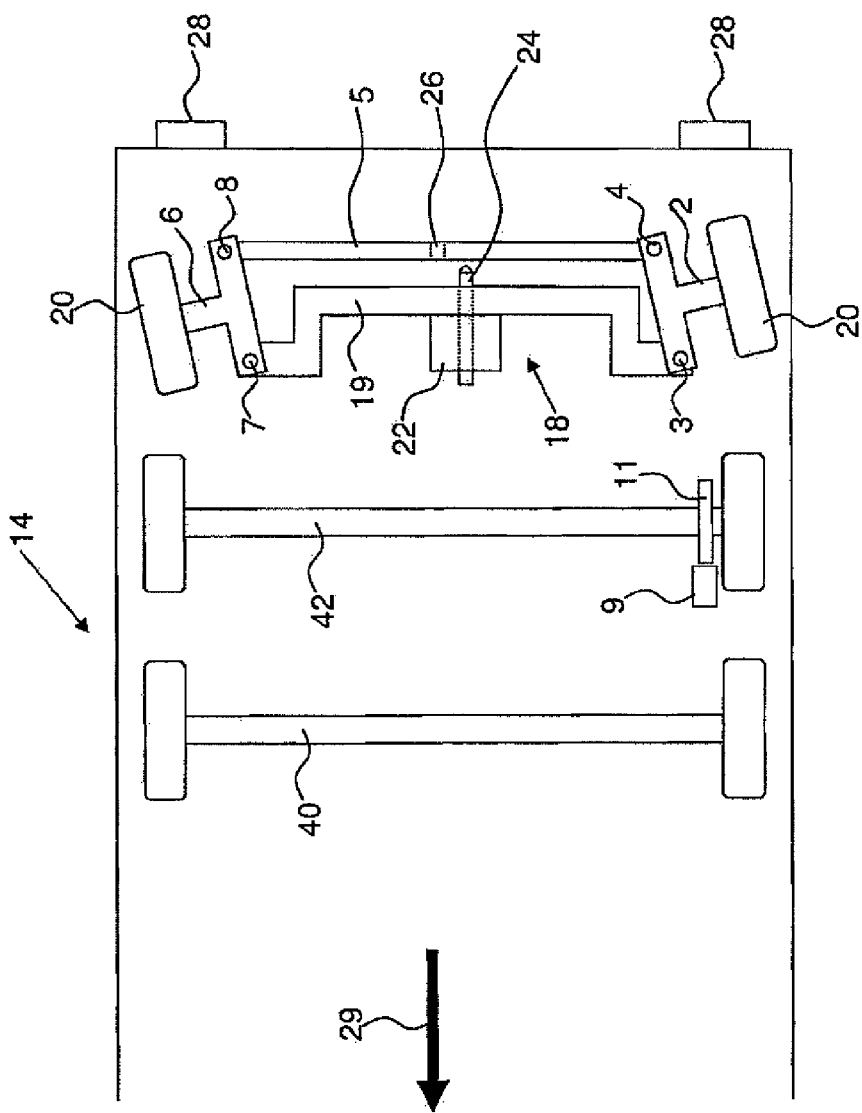
FIG. 2 is a top down view of the semitrailer according to FIG. 1.

FIG. 2 is a view from above of the rear region of the trailer 14, wherein the region of the axle unit that has axles 18, 40, 42 is illustrated. The forward travel direction of the trailer 14 is illustrated by an arrow 29.

With reference to FIG. 2 in particular, an example of a steered axle 18 in the form of a self-steered trailing axle is described. The steered axle 18 has a central axle body 19 that is, for example, fixedly attached to the frame of the trailer 14. The steered axle 18 can also be embodied as a liftable steered axle. In this case, the central axle body 19 can be raised and lowered by means of the above-mentioned lifting bellows and air spring bellows.

Stub axles 2, 6 are attached to the central axle body 19 via articulation points 3, 7, and can be pivoted about the articulation points 3, 7. A wheel 20 is located on each of the stub axles 2, 6, and can have single or multiple tires (for example twin tires). The stub axles 2, 6 are connected via further articulation points 4, 8 to a track rod 5. A constant distance between the further articulation points 4, 8 is ensured via the track rod 5, with the result that both stub axles 2, 6 carry out synchronous steering movements.

A locking device 22 is mounted on the central axle body 19. The locking device 22 has an extendable locking bolt 24 that can be retracted, for example, by a magnetic force or by turning a threaded rod, and can be extended. For this, the locking device 22 has an electrical actuator, for example an electromagnet or an electric motor. FIG. 2 shows the locking bolts 24 in the retracted position. The track rod 5 has a cutout 26 that is configured in terms of its cross section to receive the locking bolt 24. By extending the locking bolt 24 it is possible to bring about locking of the steered axle 18 in the straight-ahead travel direction by means of the locking device 22. In this context, the locking bolt 24 is extended and then engages in the cutout 26.

FIG. 2 also illustrates a direction-detecting speed sensor 9 that senses the rotation of a gearwheel 11 that is fixedly connected to the axle 42. The speed sensor 9 serves as a sensor to detect forward travel or reversing of the trailer 14.

The actuator of the locking device 22, the speed sensor 9 and the actuators of the lifting bellows and of the air spring bellows of the lifting axle 40 are connected to the electronic control unit 32 by means of electrical lines (not illustrated). The actuators can also be embodied, at least to a certain extent, as a common structural unit with the electronic control unit 32. In this case, for example, the lifting bellows and/or the air spring bellows of the lifting axle 40 are connected to pneumatic valves of the common structural unit via pneumatic lines.

The electronic control unit 32 carries out the open and closed-loop control processes in the trailer 14 according to the inventive embodiments. For this, the electronic control unit 32 receives not only the speed signal from the speed sensor 9, but also further signals, for example air pressures in a pneumatic suspension system, a reversing signal from the controller 36 in the tractor vehicle 12 or, if appropriate, further signals from the controller 36.

Figure 3A:
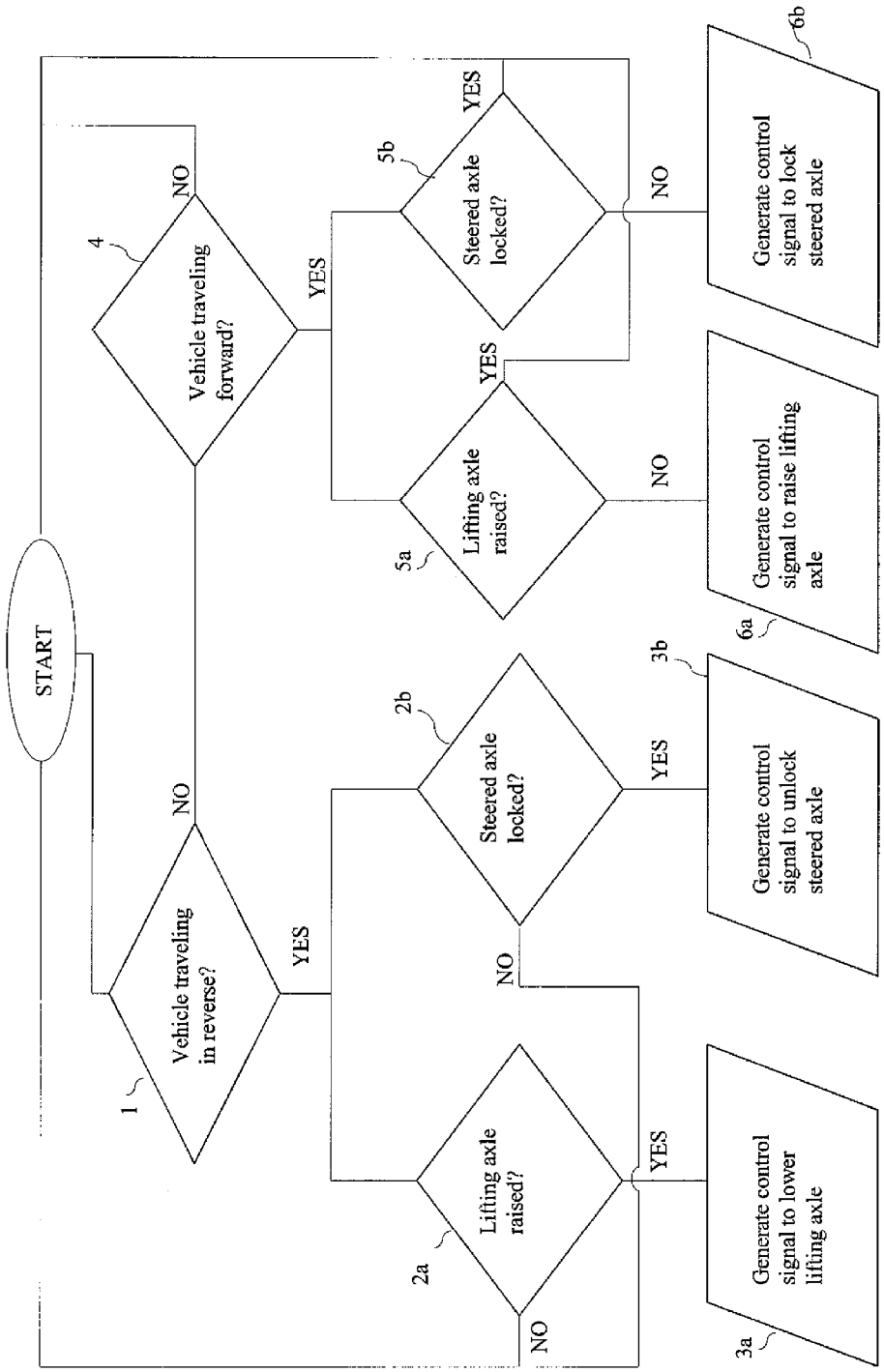
FIGS. 3a-3c are flow charts depicting exemplary process steps for controlling the lifting axle and/or steered axle of a vehicle according to embodiments of the present invention.

Referring now to FIG. 3a, an exemplary method for controlling the lifting axle and/or steered axle of a vehicle includes checking, utilizing the control unit 32, whether the trailer 14 is traveling in reverse (step 1). If reversing is detected, the control unit 32 checks whether the lifting axle 40 is raised and/or whether the steered axle 18 is locked (steps 2a/2b). If the lifting axle 40 is raised and/or the steered axle 18 is locked, the control unit 32 generates a control signal to lower the lifting axle (step 3a), and/or a control signal to unlock the steered axle by releasing the locking device 22 (step 3b). Lowering the lifting axle during reversing relieves loading of the other axles of the vehicle by distributing the overall load among a plurality of axles. A salutary result is a reduction of the loading on roads and bridges. Unlocking the steered axle provides improved vehicle maneuverability of the vehicle during reversing, as well as further relieving loading on roads and bridges.

As also illustrated in FIG. 3a, the control unit 32 can optionally also be programmed to check whether the trailer 14 is traveling forwards (step 4). When forward travel is detected, the control unit 32 checks whether the lifting axle 40 is raised and/or whether the steered axle 18 is locked (steps 5a/5b). If the lifting axle 40 is not raised and/or the steered axle 18 is not locked, the control unit 32 generates a control signal to raise the lifting axle (step 6a), and/or a control signal to lock the steered axle (step 6b).

It should be understood that the control signals generated by the control unit 32 can, for example, be electrical actuation signals for solenoid valves or electromagnets, or data signals emitted via a data bus, for example a CAN bus.

Figure 3B:
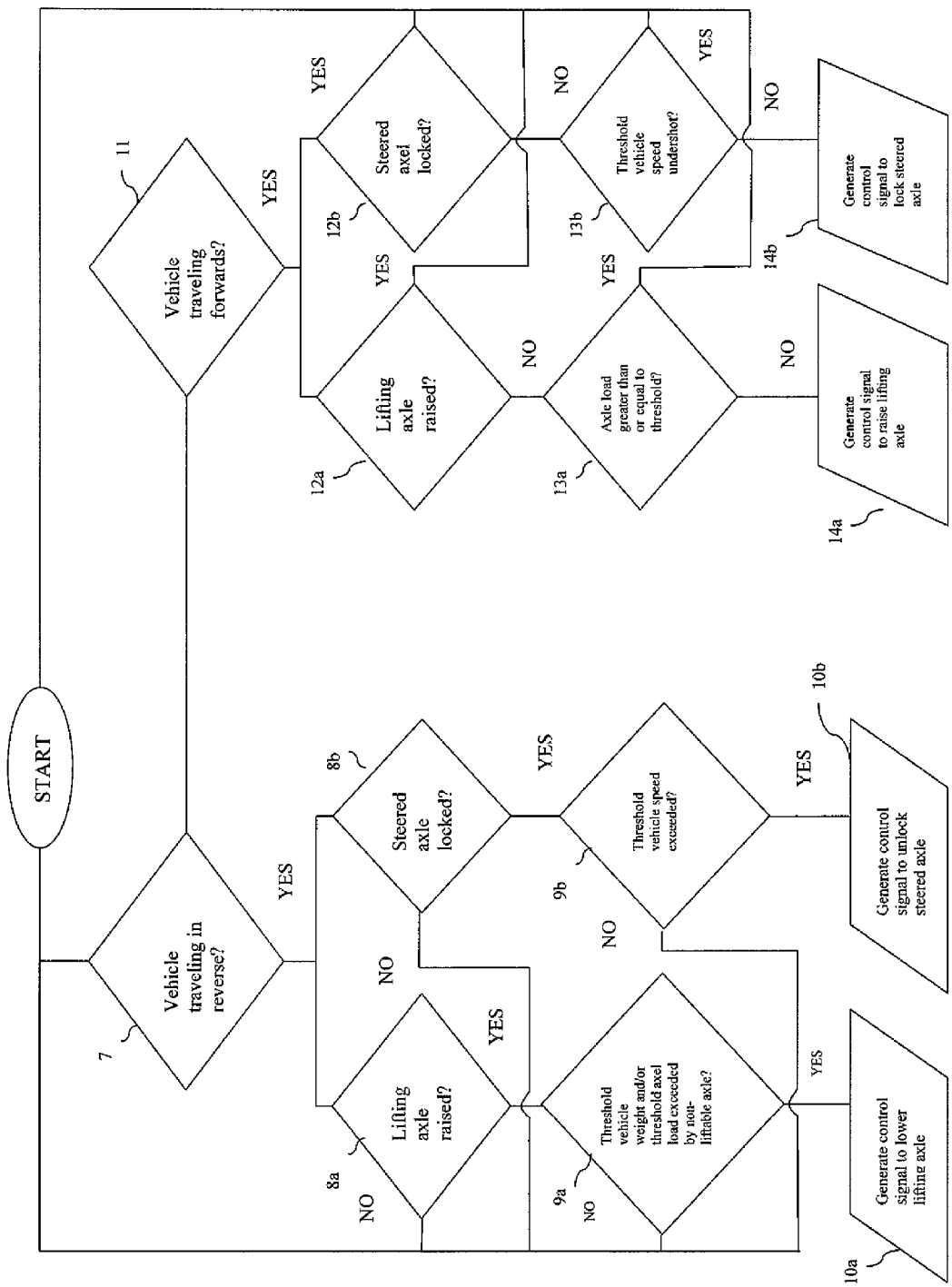

Alternatively, as illustrated in FIG. 3b, the control signal by which the lifting axle 40 is lowered is not generated by the control unit 32 in the case of reversing until a predefined threshold vehicle weight and/or a predefined threshold axle load (18, 40) is/are exceeded by one or more of the non-liftable axles of the vehicle (step 9a). The lowering of the lifting axle is therefore not initiated in a global fashion when reversing is detected, but rather only when indicated by the vehicle weight and/or an axle load from one or more non-liftable axles.

Also, it can be provided that the control signal by which the steered axle 18 is unlocked is not generated by the control unit 32 in the case of reversing until a predefined threshold vehicle speed is exceeded (step 9b). The predefined vehicle speed is preferably defined at a low level, for example about 3 km/h.

In the case of forward travel, the lifting axle 40 can automatically be raised when the axle load undershoots a predefined threshold value at the steered axle 18 or the second axle 42 (steps 13a and 14a). Also, the lifting axle can be automatically lowered when an axle load at the steered axle or second axle exceeds the predefined threshold value. In addition, the steered axle 18 can automatically be locked by actuation of the locking device 22 to improve the straight-ahead travel of the trailer 14 when a predefined threshold speed is exceeded (steps 13b and 14b).

Figure 3C:
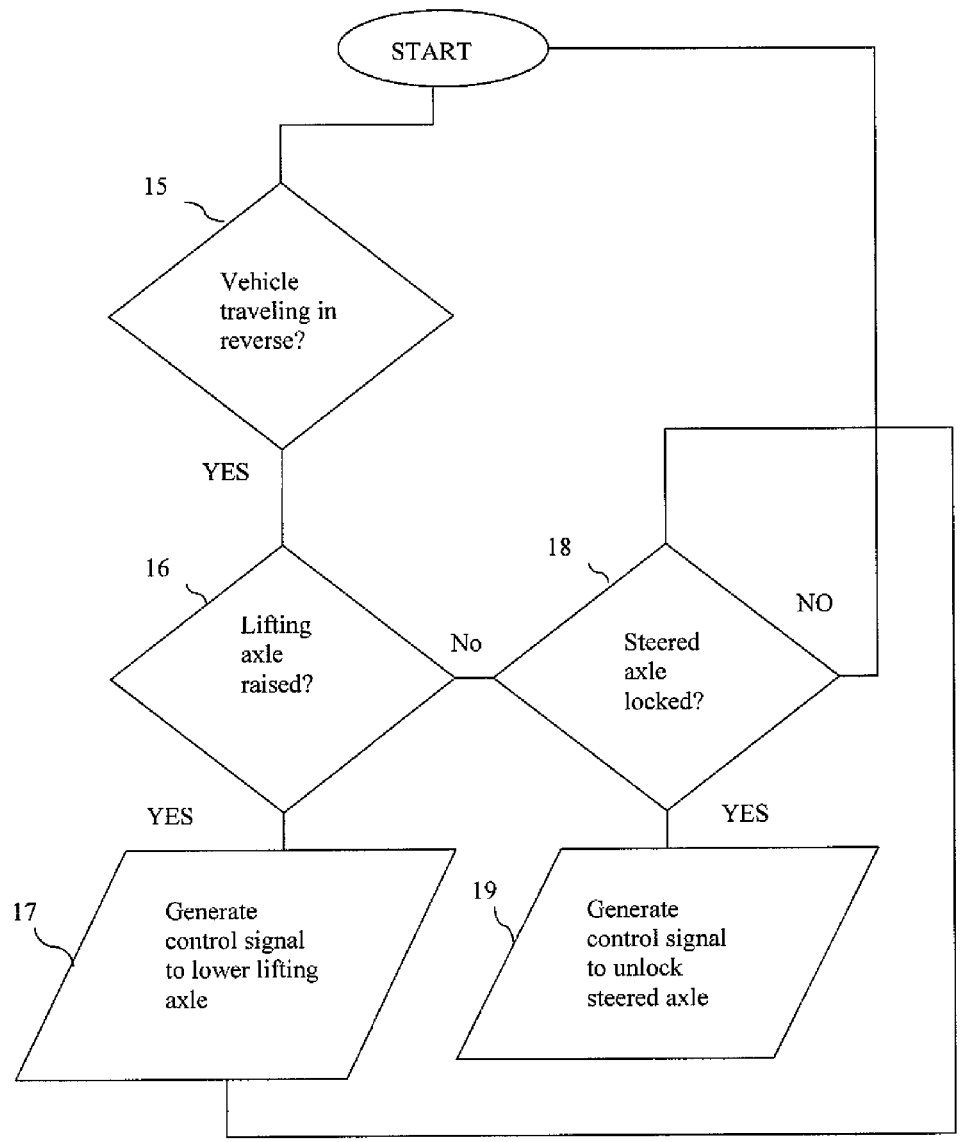

According to another embodiment of the inventive method for controlling the lifting axle and/or steered axle of a vehicle as illustrated in FIG. 3c, the control signal by which the steered axle 18 is unlocked is generated by the control unit 32 in the case of reversing only if the lifting axle 40 is lowered. For this, the control unit 32 checks whether the lifting axle is lowered (step 16); and only if it is lowered does it generate the control signal for unlocking the steered axle (step 19). It is advantageous here for the vehicle axle to be embodied as a combined liftable steered axle. In such case, it is ensured that a raised lifting axle is not undesirably unlocked in the case of reversing and could therefore assume an undefined state.

Preferably, the control unit 32 receives and processes operator control signals that are input by an operator via at least one operator control element 15, and can carry out control of the lifting axle 40 and/or of the steered axle 18 as predefined by the operator control signals. According to an embodiment of the inventive method, operator control has priority over the automatic control of the lifting axle 40 and/or of the steered axle 18. As a result, the vehicle operator or driver, can, when necessary, override the automatically carried-out control of the lifting axle and/or of the steered axle at any time and set a desired state of the lifting axle and of the steered axle.

In accordance with another embodiment of the inventive method, the control unit 32 determines whether the vehicle 14 is traveling in reverse based on a reversing signal received from a sensor 9. The reversing signal can be transmitted, for example, from a control system of the tractor vehicle to a control unit provided in a trailer. The use of a separate sensor, in particular of a wheel speed sensor of an ABS or of a longitudinal acceleration sensor is advantageous here. Furthermore, what are referred to as direction-detecting speed sensors, for example an S18-37ADSD-RGT21 sensor from SENSOR SOLUTIONS, can advantageously be used.

Ideally, in the case of reversing, the control unit 32 automatically switches on at least one reversing light 28 of the vehicle. This can, in particular, be advantageously combined with the provision of a sensor for sensing reversing of the vehicle (the sensor being, for example, one of the sensors noted above). In this case, it is possible to dispense with a reversing signal that is transmitted from another control system of the vehicle, for example from the tractor vehicle of a tractor-trailer combination. Control of the reversing light can then be carried out autonomously at a trailer.

It should be appreciated that, compared to simple, mechanical-pneumatic solutions, the use of an electronic control has the advantage that by means of corresponding programming it is possible, for example, to avoid from the outset hysteresis effects such as can occur with pressure switches. As a result, more precise control of the lifting axle and of the steered axle is possible.

A further advantage of the electronic control is that specific parameters of the control method such as, for example, values for the predefined vehicle weight, a predefined axle load for lowering or raising the lifting axle or a predefined vehicle speed for locking or unlocking the steered axle can easily be set and therefore changed. Such data can be stored, for example, in a parameter memory of the electronic control unit. As a result, the inventive embodiments can easily be adapted to different external requirements.

Accordingly, the present invention provides embodiments of a vehicle axle control method, device and system that advantageously complies with SPIF regulations or the like by reducing loading on roads and bridges. This is accomplished via automatically raising and lowering the lifting axle and/or automatically locking and unlocking the steered axle.

It will thus be seen that the objects set forth above, among those made apparent from the preceding description, are efficiently attained, and since certain changes may be made in the above constructions and processes without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An axle control method for a vehicle, said vehicle having at least one of a lifting axle and a steered axle, and a control device adapted to control at least one of raising and lowering of said lifting axle and locking and unlocking of said steered axle, wheels of the steered axle being (i) restricted from being steered when the steered axle is locked and (ii) steerable when the steered axle is unlocked, the method comprising the steps of: utilizing said control device, determining whether said vehicle is traveling in reverse, and when said vehicle is traveling in reverse, automatically generating at least one of a first lifting axle control signal that lowers said lifting axle and a first steered axle control signal that unlocks said steered axle.

2. The method according to claim 1, wherein said vehicle is a utility vehicle trailer.

3. The method according to claim 1, further comprising the steps of: utilizing said control device, determining whether said vehicle is traveling forwards, and when said vehicle is traveling forwards, automatically generating at least one of a second lifting axle control signal that raises said lifting axle and a second steered axle control signal that locks said steered axle.

4. The method according to claim 1, wherein said first lifting axle control signal is generated by said control device only when at least one non-liftable axle of said vehicle exceeds at least one of a predefined vehicle weight and a predefined axle load.

5. The method according to claim 1, wherein said first steered axle control signal is generated by said control device only when a predefined vehicle speed is exceeded.

6. The method according to claim 1, wherein said first steered axle control signal is generated by said control device only when said lifting axle is lowered.

7. The method according to claim 1, wherein when said control device receives an operator control signal for effecting control of said lifting axle said step of automatically generating a first lifting axle control signal that lowers said lifting axle is preempted.

8. The method according to claim 1, wherein when said control device receives an operator control signal for effecting control of said steered axle said step of automatically generating a first steered axle control signal that unlocks said steered axle is preempted.

9. The method according to claim 1, wherein said at least one lifting axle and said at least one steered axle are provided as a combined liftable steered axle, and said control device is adapted to control said combined liftable steered axle.

10. The method according to claim 1, wherein said step of determining whether said vehicle is traveling in reverse is based on said control device receiving input from a sensor.

11. The method according to claim 10, wherein said sensor is one of a direction-detecting speed sensor, a wheel speed sensor of an anti-lock braking system and a longitudinal acceleration sensor.

12. The method according to claim 1, further comprising the step of automatically turning on at least one reversing light of said vehicle utilizing said control device.

13. A control device including a processor programmed to effect the axle control method for a vehicle according to claim 1.

14. A control device including a processor programmed to effect the axle control method for a vehicle according to claim 2.

15. A control device including a processor programmed to effect the axle control method for a vehicle according to claim 3.

16. A control device including a processor programmed to effect the axle control method for a vehicle according to claim 4.

17. A control device including a processor programmed to effect the axle control method for a vehicle according to claim 5.

18. A control device including a processor programmed to effect the axle control method for a vehicle according to claim 6.

19. A control device including a processor programmed to effect the axle control method for a vehicle according to claim 7.

20. A control device including a processor programmed to effect the axle control method for a vehicle according to claim 8.

21. A control device including a processor programmed to effect the axle control method for a vehicle according to claim 9.

22. A control device including a processor programmed to effect the axle control method for a vehicle according to claim 10.

23. A control device including a processor programmed to effect the axle control method for a vehicle according to claim 11.

24. A control device including a processor programmed to effect the axle control method for a vehicle according to claim 12.

25. A vehicle control system having at least one of an anti-lock braking system and an electronically controlled braking system including the control device according to claim 13.

26. A vehicle control system having at least one of an anti-lock braking system and an electronically controlled braking system including the control device according to claim 14.

27. A vehicle control system having at least one of an anti-lock braking system and an electronically controlled braking system including the control device according to claim 15.

28. A vehicle control system having at least one of an anti-lock braking system and an electronically controlled braking system including the control device according to claim 16.

29. A vehicle control system having at least one of an anti-lock braking system and an electronically controlled braking system including the control device according to claim 17.

30. A vehicle control system having at least one of an anti-lock braking system and an electronically controlled braking system including the control device according to claim 18.

31. A vehicle control system having at least one of an anti-lock braking system and an electronically controlled braking system including the control device according to claim 19.

32. A vehicle control system having at least one of an anti-lock braking system and an electronically controlled braking system including the control device according to claim 20.

33. A vehicle control system having at least one of an anti-lock braking system and an electronically controlled braking system including the control device according to claim 21.

34. A vehicle control system having at least one of an anti-lock braking system and an electronically controlled braking system including the control device according to claim 22.

35. A vehicle control system having at least one of an anti-lock braking system and an electronically controlled braking system including the control device according to claim 23.

36. A vehicle control system having at least one of an anti-lock braking system and an electronically controlled braking system including the control device according to claim 24.

37. An axle control method for a vehicle, said vehicle having a lifting axle and a steered axle, and a control device adapted to control raising and lowering of said lifting axle and locking and unlocking of said steered axle, the method comprising the steps of: utilizing said control device, determining whether said vehicle is traveling in reverse, and when said vehicle is traveling in reverse, automatically generating a first lifting axle control signal that lowers said lifting axle and a first steered axle control signal that unlocks said steered axle.

* * * * *